US006490495B1

(12) United States Patent
Murata (10) Patent No.: US 6,490,495 B1
(45) Date of Patent: Dec. 3, 2002

(54) AUTOMATIC CUTTING AND CRIMPING APPARATUS

(75) Inventor: Osamu Murata, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/417,693

(22) Filed: Oct. 13, 1999

(30) Foreign Application Priority Data

Oct. 14, 1998 (JP) .......................................... 10-292486

(51) Int. Cl.[7] .............................................. G06F 19/00
(52) U.S. Cl. ............................ 700/117; 700/111; 705/11
(58) Field of Search ......................... 700/95, 99, 100, 700/111, 117, 180, 160; 705/11, 32; 29/33 M, 755, 748

(56) References Cited

U.S. PATENT DOCUMENTS 5,212,635 A * 5/1993 Ferriter ........................ 705/11
5,553,376 A 9/1996 Solanki et al. ................. 29/833
5,623,376 A 4/1997 Tamura ........................... 29/33
5,623,753 A * 4/1997 Tamura ....................... 29/33 M

FOREIGN PATENT DOCUMENTS

JP 8-069722 3/1996

OTHER PUBLICATIONS

European Search Report re: 99120004.9–2217 mailed Apr. 25, 2002.

* cited by examiner

Primary Examiner—Maria N. Buhr
Assistant Examiner—Steven R Garland (57) ABSTRACT

When a reset-up work has been generated associated with a changing in processing data between old and new lots, a cumulative standard time required for the operator to carry out the reset-up work is calculated, and a lapse time since the starting of the reset-up work is subtracted from the calculated cumulative standard time to obtain a cumulative standard remaining time, and the count-down of this cumulative standard remaining time is displayed.

9 Claims, 5 Drawing Sheets

00:03:30 LEFT BEFORE COMPLETION OF RESET-UP

AUTOMATIC CUTTING AND CRIMPING APPARATUS

BACKGROUND OF THE INVENTION

1. Field of the Invention

The present invention relates to an automatic cutting and crimping apparatus for cutting an electric wire by intermittently feeding the wire for each product wire length and sequentially carrying out a desired terminal processing of the cut wires such as a stripping of covered wires and a crimp-style connection of a terminal metal member at a terminal portion of the wires, according to a plurality of processing data including attribute information own to each manufacturing wire, thereby to sequentially manufacture wires finished with a desired processing, and relates, more particularly, to an automatic cutting and crimping apparatus for enabling an operator to easily understand a progress status of reset-up of items along with the proceeding of this work thereby to substantially improve the efficiency of the reset-up work.

2. Description of Related Art

There has been known an automatic cutting and crimping apparatus for cutting an electric wire by intermittently feeding the wire for each product wire length and sequentially carrying out a desired terminal processing of the cut wires such as a stripping of covered wires and a crimp-style connection of a terminal metal member at a terminal portion of the wires, according to a plurality of processing data including attribute information own to each manufacturing wire, thereby to sequentially manufacture wires finished with a desired processing, as disclosed in, for example, Japanese Patent Application Laid-open No. 8-69722.

The automatic cutting and crimping apparatus disclosed in the above-described publication is planned to smoothly carry out an reset-up work such as a reset-up of electric wires, terminal metal members or crimping dies, that are generated in sequentially and continuously manufacturing products of lots of mutually different specifications in wire diameters, metal members, etc., and makes a display of only the contents necessary for a reset-up of items on the display at the time of the reset-up.

According to the above-described conventional automatic cutting and crimping apparatus, the operator can look at the contents of the display and thus properly understand the contents necessary for reset-up such as change of set conditions, materials to be changed, so as to carry out the reset-up promptly and accurately regardless of the level of skillfulness of the operator.

However, according to the above-described prior-art automatic cutting and crimping apparatus, the apparatus makes a display of only the contents necessary for an reset-up on the display, and the apparatus does not make any display of time information such as the time required for the operator to carry out the reset-up and the time taken since the reset-up work has started. Therefore, there has been a problem to be solved that it is difficult for the operator to understand the progress status of the reset-up work along with the proceeding of this work.

Thus, there has been desired among parties concerned a development of a novel technique which enables the operator to easily understand the progress status at any time along with the proceeding of the reset-up work.

SUMMARY OF THE INVENTION

The present invention has been made in the light of the above-described situation, and it is an object of the invention to provide an automatic cutting and crimping apparatus which calculates a cumulative standard time required for the operator to carry out a reset-up work when a reset-up work to be carried out has arisen associated with a reset-up in processing data between old and new lots, sequentially subtracts a lapse time since the starting of a reset-up work from the calculated cumulative standard time to obtain a cumulative standard remaining time, and makes a count-down display of this cumulative standard remaining time, thereby to enable the operator to easily understand the progress status of the reset-up work at any time along with the proceeding of this work, and thus makes it possible to substantially improve the efficiency of the reset-up work.

In order to achieve the above object, according to a first aspect of the present invention, there is provided an automatic cutting and crimping apparatus for cutting an electric wire by intermittently feeding the wire for each product wire length and sequentially carrying out a desired terminal processing of the cut wire such as a stripping of covered wires and crimp-type connection of a terminal metal member at a terminal portion of the wire, according to a plurality of processing data including attribute information own to each lot of a manufacturing unit, thereby to sequentially manufacture wires finished with a desired processing, the automatic cutting and crimping apparatus comprising: processing data memory means for storing the plurality of processing data; standard time memory means for storing standard time required for an operator to carry out reset-up works, for each of reset-up items such as exchanges of the electric wire, a terminal metal member and a crimping die; processing data comparing means for comparing processing data between old and new lots by referring to the plurality of processing data stored in the processing data memory means; item extracting means for extracting a reset-up item associated with an updating of the processing data between old and new lots, based on a result of a comparison by the processing data comparing means; standard cumulative time calculating means for accumulating a standard time corresponding to a reset-up item extracted by the item extracting means, by referring to a standard time for each reset-up item stored in the standard time memory means; cumulative standard remaining time counting means for counting a cumulative standard remaining time by sequentially subtracting a lapse time since a starting of a reset-up work from the cumulative standard time calculated by the standard cumulative time calculating means; and display means for making a count-down display of the cumulative standard remaining time counted by the cumulative standard remaining time counting means.

According to this aspect, at first, the processing data comparing means compares processing data between the old and new lots by referring to a plurality of processing data stored in the processing data memory means. Based on a result of this comparison, the item extracting means extracts a reset-up item associated with an updating of the processing data between the old and new lots. Next, the standard cumulative time calculating means accumulates a standard time corresponding to a reset-up item extracted by the item extracting means, by referring to a standard time for each reset-up item stored in the standard time memory means. Then, the cumulative standard remaining time counting means calculates a cumulative standard remaining time by sequentially subtracting a lapse time since the starting of a reset-up work from the calculated cumulative standard. Then, the display means makes a count-down display of a cumulative standard remaining time counted by the cumulative standard remaining time counting means.

As explained above, according to this aspect of the invention, when a reset-up work has been generated associated with a reset-up in processing data between the old and new lots, a cumulative standard time required for the operator to carry out a reset-up work is calculated, and a lapse time since the starting of a reset-up work is subtracted from the calculated cumulative standard time to obtain a cumulative standard remaining time, and the count-down of this cumulative standard remaining time is displayed. Therefore, the operator can easily understand the progress status of the reset-up work at any time along with the proceeding of this work. As a result, it is possible to improve the efficiency of the reset-up work.

According to a second aspect of the invention, there is provided an automatic cutting and crimping apparatus of the above first aspect, wherein the display means makes the count-down display of the cumulative standard remaining time, accompanied by a display of reset-up items extracted by the item extracting means.

According to this aspect, the display means makes the count-down display of the cumulative standard remaining time, accompanied by a display of reset-up items extracted by the item extracting means. Therefore, the operator can easily understand the progress status of the reset-up work at any time along with the proceeding of this work. Further, as the items to be changed over are indicated to the operator, it is possible to improve substantially the efficiency of the reset-up work.

According to a third aspect of the invention, there is provided an automatic cutting and crimping apparatus of the above second aspect, wherein reset-up items extracted by the item extracting means are displayed in a list in a design status.

According to this aspect, reset-up items extracted by the item extracting means are displayed in a list in a design status. Therefore, as the whole items to be changed over are displayed to the operator, it is possible to improve remarkably the efficiency of the reset-up work.

According to a fourth aspect of the invention, there is provided an automatic cutting and crimping apparatus of the above second aspect, the apparatus further including: a plurality of reset-up completion detecting means for detecting work completion of each of reset-up items such as exchanges of an electric wire, a terminal metal member and a crimping die, wherein when a work completion has been detected by at least one reset-up completion detecting means out of the plurality of reset-up completion detecting means corresponding to reset-up items extracted by the item extracting means, a reset-up item of which work completion has been detected is erased from display contents on the display means.

According to this aspect, when a work completion has been detected by at least one reset-up completion detecting means out of the plurality of reset-up completion detecting means corresponding to reset-up items extracted by the item extracting means, a reset-up item of which work completion has been detected is erased from display contents on the display means. Therefore, the operator can easily understand the progress status of the reset-up work at any time along with the proceeding of this work. Further, as items of which reset-up have not yet been completed among the items to be changed over are indicated to the operator, it is possible to improve more remarkably the efficiency of the reset-up work.

According to a fifth aspect of the invention, there is provided an automatic cutting and crimping apparatus of the above second aspect, the apparatus further including: a plurality of reset-up completion detecting means for detecting work completion of each of reset-up items such as exchanges of an electric wire, a terminal metal member and a crimping die, wherein when work completions have been detected by all the reset-up completion detecting means corresponding to reset-up items extracted by the item extracting means, all the display contents relating to the reset-up on the display means are erased.

According to this aspect, when work completions have been detected by all the reset-up completion detecting means corresponding to reset-up items extracted by the item extracting means, all the display contents relating to the reset-up on the display means are erased. Therefore, when all the reset-up works has been completed, it becomes possible to make a display of necessary information of processing data associated with a lot after the reset-up, in place of display contents of the reset-up that is no more necessary. As a result, it is possible to provide an extremely practical information providing status.

According to a sixth aspect of the invention, there is provided an automatic cutting and crimping apparatus of the above fourth or fifth aspect, wherein the plurality of reset-up completion detecting means detect the work completions of reset-up items respectively, by utilizing a fact that the positions of members in which respective detecting means are provided during a processing period are different from the positions of the members during a reset-up period.

According to this aspect, it is possible to properly detect a completion of the reset-up work.

The nature, principle and utility of the invention will become more apparent from the following detailed description when read in conjunction with the accompanying drawings.

DETAILED DESCRIPTION OF THE PREFERRED EMBODIMENTS

There will be explained in detail below one embodiment of an automatic cutting and crimping apparatus relating to the present invention, with reference to the drawings.

At first, a function of the automatic cutting and crimping apparatus relating to the present invention will be explained. The automatic cutting and crimping apparatus is structured to cut a covered electric wire (hereinafter to be simply referred to as an electric wire) wound around a wire reel by intermittently feeding the electric wire for each product wire length obtained from processing data described below and to sequentially carry out a desired terminal processing such as a stripping of covered wires and a crimp-type connection of a terminal metal member at a terminal portion of the cut electric wire, according to a plurality of processing data including attribute data own to each lot of manufacturing unit, thereby to sequentially manufacture electric wires finished with a desired processing.

Figure 3:
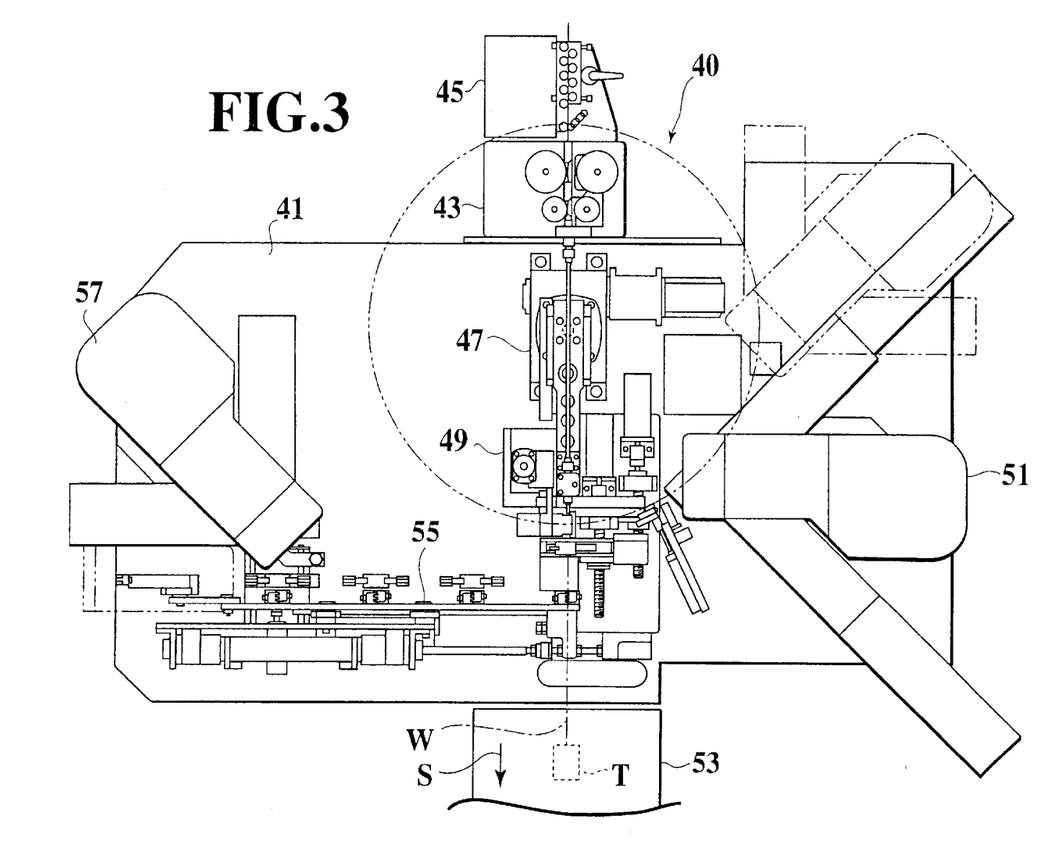
FIG. 3 is a schematic plan view for showing a mechanical structure of the automatic cutting and crimping apparatus.

This will be explained in detail. As shown in FIG. 3, an automatic cutting and crimping apparatus 40 is structured by the following members: a base stand 41; a size measuring unit 43 installed at the rear end of approximately the center on the base stand 41, for measuring the size of an electric wire W for each product wire length obtained from processing data; a correcting unit 45 provided at the upstream side of the size measuring unit 43, for correcting a bending of the electric wire W drawn out from a wire reel not shown and for supplying the corrected wire W to the size measuring unit 43; a turning carrier unit 47 axially supported at the rear end of approximately the center on the base stand 41, for carrying by turning a terminal portion at the send-out side of the electric wire W sent out from the size detecting unit 43 so as to position this terminal portion at a cut and stripping processing unit 49 or a first terminal processing unit 51 described below respectively; the cut and stripping processing unit 49 installed at the front end of approximately the center on the base stand 41, for cutting the electric wire W and stripping of a covered insulation material at both terminal portions of the electric wire W cut for each product wire length; the first terminal processing unit 51 installed at one side on the base stand 41, for carrying out a crimp-type connection of a terminal metal member T to one end of the electric wire W having been stripped by the cut and stripping processing unit 49; a belt conveyer unit 53 provided adjacently to the send-out direction of the electric wire W on the base stand 41, for moving the send-out side portion of the electric wire W to stretch almost linearly along a send-out direction S by being driven when the length of the electric wire W sent out from the size measuring unit 43 exceeds a threshold wire length; a linear carrying unit 55 provided to extend from approximately the center of the front end on the base stand 41 to the other side, for linearly carrying the electric wire W having the terminal metal member T crimp-type-connected at its one end from approximately the center at the front end on the base stand 41 to the other side; and a second terminal processing unit 57 installed at the other side on the base stand 41, for crimp-type-connecting the terminal metal member T to the other end of the electric wire W that has the terminal metal member T crimp-type-connected at its one end and that has been carried by the linear carrying unit 55.

Figure 4:
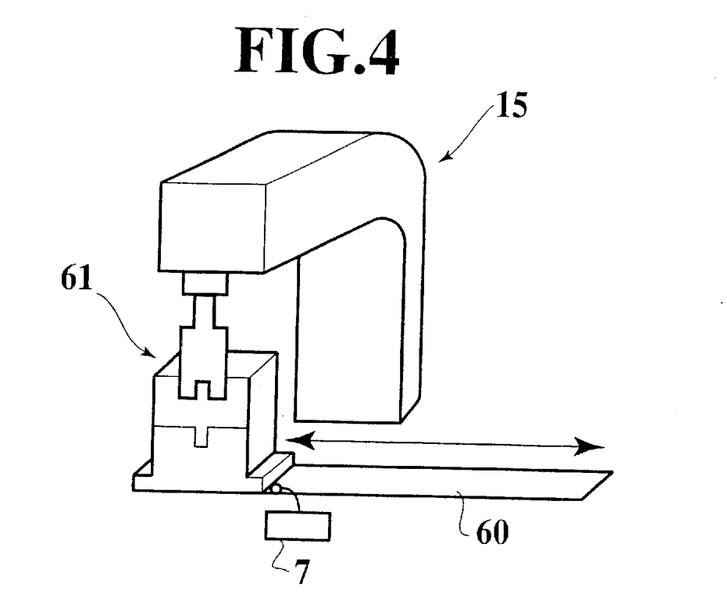
FIG. 4 is a perspective view for showing a schematic configuration of a first terminal processing unit.

In more detail, as shown in FIG. 4, the first terminal processing unit 51 is structured by the following members: a rail 60; an applicator 61 movably disposed at a processing position and a save position along on this rail 60, for crimp-type-connecting the terminal metal member T to one end of the electric wire W having been stripped by the cut and stripping processing unit 49; and a first applicator sensor 7 such as a limit switch, for example, for detecting whether a reset-up of a crimping die forming a part of the applicator 61 has been completed or not, by detecting whether the applicator 61 is being set at the processing position or not on the rail 60. Similar to the first terminal processing unit 51, the second terminal processing unit 57 is structured by a second applicator sensor 9 having a function equivalent to that of the first applicator sensor 7.

Figure 5:
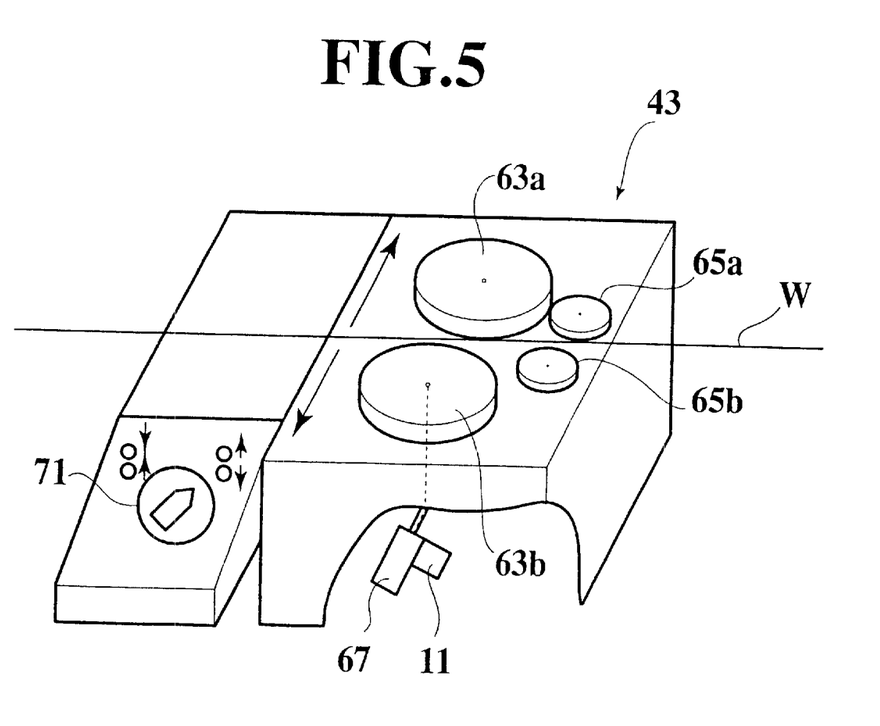
FIG. 5 is a perspective view for showing a schematic configuration of a size measuring unit.

As shown in FIG. 5, the size measuring unit 43 is structured by the following members: a pair of send-out rolls 63a and 63b for intermittently sending out the electric wire W; a pair of size measuring rolls 65a and 65b for measuring the size of the electric wire W for each product wire length obtained from processing data; a rotary axis moving cylinder 67 for moving each rotary axis of the send-out rolls 63a and 63b and the size measuring rolls 65a and 65b respectively so as to separate a distance between the opposing rolls; a size measuring roll sensor 11 for detecting whether a gap between the respective opposing rolls is in an open status or a closed status, by detecting a move position in the rotary axis moving cylinder 67; and an open/close switch 71 used for changing over between the open and closed statuses of the gap between the rolls. It is also possible to detect the open status or the closed status of the gap between the opposing rolls by referring to a change-over position of the open/close switch 71.

Figure 1:
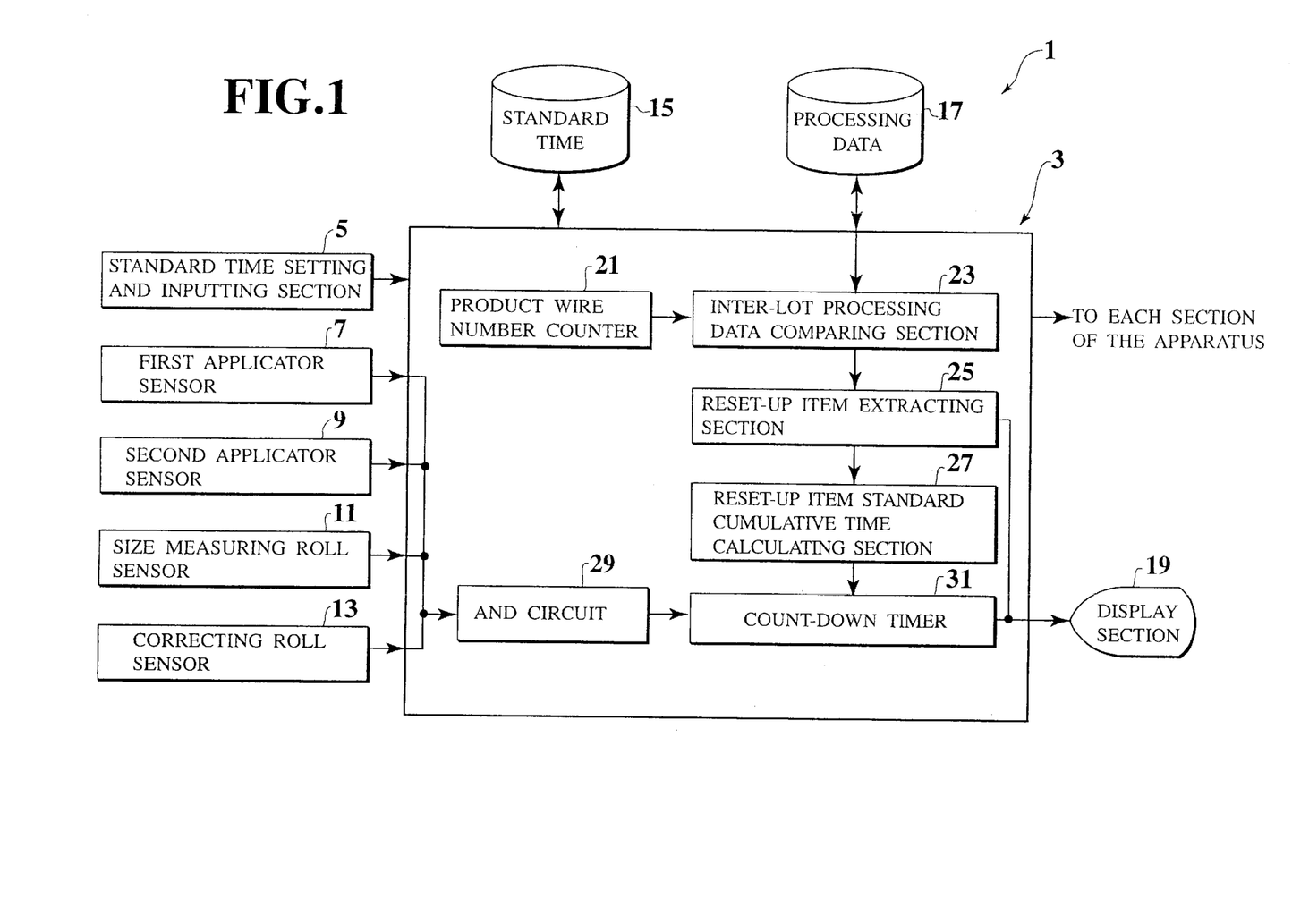
FIG. 1 is a functional block configuration diagram of an automatic cutting and crimping apparatus according to the present invention.
Figure 6:
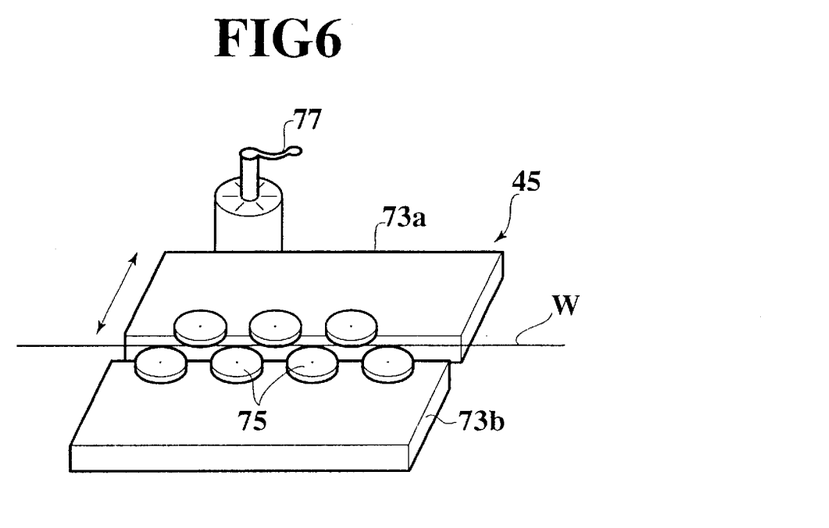
FIG. 6 is a perspective view for showing a schematic configuration of a correcting unit.

As shown in FIG. 6, the correcting unit 45 is structured by the following members: a pair of correcting rolls holding members 73a and 73b having a plurality of correcting rolls 75 rotatably installed at opposing portions of the members so that the correcting rolls 75 are aligned in a zigzag shape as a whole; an operation lever 77 to be used for changing over between the open status and the closed status of the gap between the pair of correcting rolls holding members 73a and 73b; a setting dial not shown to be used for adjusting the gap between the opposing holding members 73; and a correcting roll sensor 13 shown in FIG. 1 for detecting whether the gap between the opposing holding members 73 is in the open status or the closed status, by detecting an operation status of the operation lever 77.

In this case, each of the above-described first and second applicator sensors 7 and 9, the size measuring roll sensor 11 and the correcting roll sensor 13 detects whether the apparatus is in the processing operation or in the reset-up operation, by utilizing a fact that the structural members in which these sensors are provided are located at different positions between the processing operation period and the reset-up operation period.

Next, the structure of a control unit 1 having the function of controlling the operation of the automatic cutting and crimping apparatus 40 and for structuring a part of the automatic cutting and crimping apparatus 40 will be explained with reference to FIG. 1.

As shown in FIG. 1, the control unit 1 is structured by the following members: an information processing section 3 for controlling the operation of the automatic cutting and crimping apparatus 40; a standard time setting and inputting section 5; first and second applicators 7 and 9 functioning as a plurality of reset-up completion detecting means; a size measuring roll sensor 11; a correction roll sensor 13; a standard time memory section 15 functioning as standard time memory means; a processing data memory section 17 functioning as processing data memory means; and a display section 19 functioning as display means.

The standard time setting and inputting section 5 is used for inputting a standard time required for the operator to carry out each reset-up work, for each reset-up item of an electric wire W, a terminal metal member T or a crimping die.

The standard time memory section 15 has the function of storing a standard time required for each reset-up work to be carried out, input by the standard time setting and inputting section 5.

The processing data memory section 17 has the function of storing a plurality of processing data including attribute information own to each lot as a manufacturing unit, such as a wire diameter, a type of a terminal metal member T, a type of a crimping die, a product wire length, a number of product wires, etc.

The display section 19 has the function of making the count-down display of a cumulative standard remaining time to be described later, accompanied by the display of items necessary for reset-up, when there has been generated a reset-up work associated with a change in the processing data between the old and new lots.

The information processing section 3 is structured by the following members: a product wire number counter 21 for sequentially counting the number of product wires manufactured in a certain lot: an inter-lot processing data comparing section 23 functioning as processing data comparing means; a reset-up item extracting section 25 functioning as item extracting means; a reset-up standard cumulative calculating section 27 functioning as standard cumulative time calculating means; an AND circuit 29 for carrying out an AND operation for input signals from sensors corresponding to reset-up, out of the sensors 7, 9, 11 and 13, and for outputting a result of this operation; and a count-down timer 31 functioning as cumulative standard remaining time calculating means.

The inter-lot processing data comparing section 23 has the function of referring to a counting result in the product wire number counter 21 and, at a time when the counting result has reached a desired number of product wires to be manufactured in a certain lot or at a certain suitable point of time before the result has reached the desired number, referring to a plurality of processing data stored in the processing data memory section 17 so as to compare the processing data between the old and new lots. In this case, the comparison of the processing data between the old and new lots means the comparison of the processing data between the current lot and the next lot.

The reset-up item extracting section 25 has the function of extracting reset-up items associated with the updating of the processing data between the old and new lots, based on a result of the comparison by the inter-lot processing data comparing section 23. More specifically, the reset-up item extracting section 25 is structured to extract all relevant reset-up items without fail, by focusing on a portion of a difference in processing data between the old and new lots. For example, when wire diameters are different with each other, a reset-up item relating to exchanging of an electric wire is extracted. When terminal metal members T are different with each other, a reset-up item relating to exchanging of a terminal metal member T is extracted. When crimping dies are different with each other, a reset-up item relating to exchanging of a crimping die is extracted.

The reset-up standard cumulative time calculating section 27 has the function of cumulative calculating a standard time corresponding to reset-up items extracted by the reset-up item extracting section 25, by referring to a standard time for each reset-up item stored in the standard time memory section 15.

The count-down timer 31 has the function of counting a cumulative standard remaining time by sequentially subtracting a lapse time since the starting of a reset-up work from the cumulative standard time calculated by the reset-up standard cumulative time calculating section 27. The count-down timer 31 is structured as follows. When a result of the calculation sent from the AND circuit 29 indicates that at least one sensor out of the sensors for the reset-up has not detected a completion of the reset-up, the count-down timer 31 continues the time counting, and sequentially updates the count-down display of the display section 19. On the other hand, when a result of the calculation sent from the AND circuit 29 indicates that all the sensors for the reset-up have detected completion of the reset-up, the count-down timer 31 stops the time counting, and erases the count-down display of the display section 19.

Figure 2:
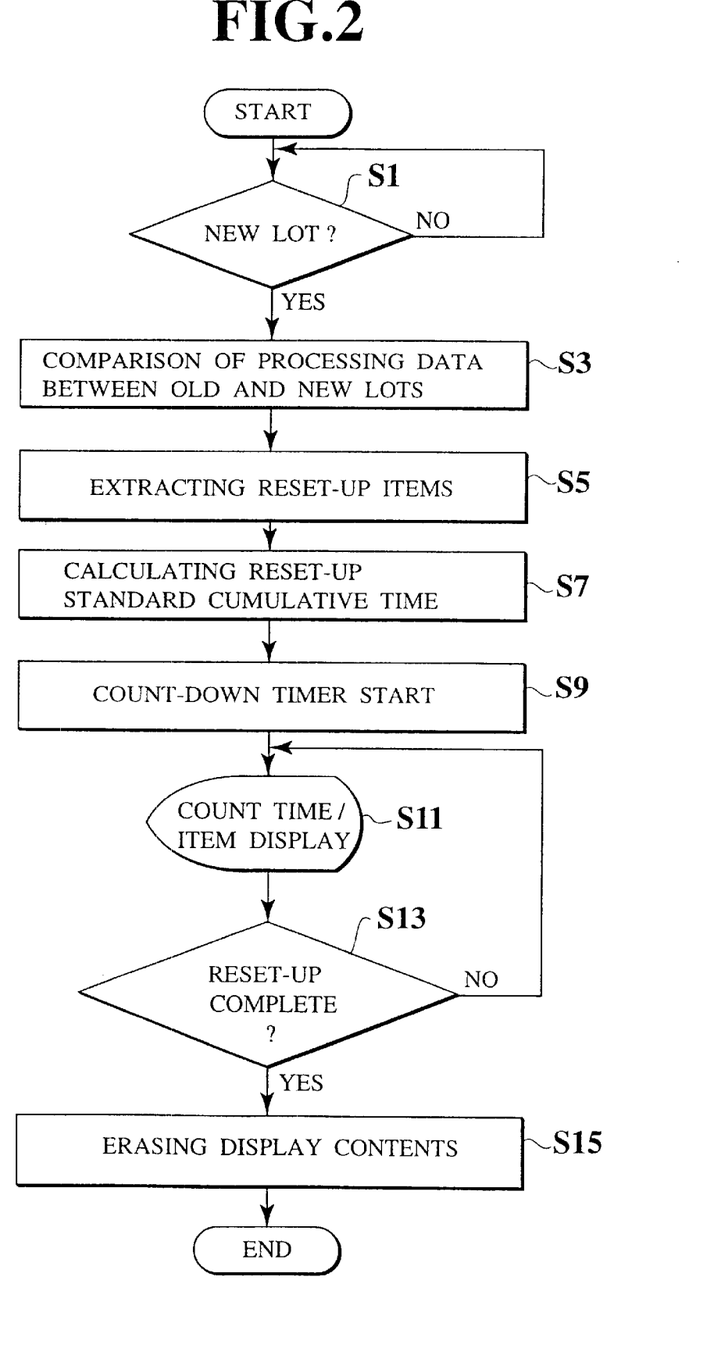
FIG. 2 is a flowchart for showing an operation at a main portion of the automatic cutting and crimping apparatus.

Next, the operation of the automatic cutting and crimping apparatus relating to the present invention will be explained with reference to the operation flowchart shown in FIG. 2.

In step S1, the inter-lot processing data comparing section 23 refers to a counting result in the product wire number counter 21 and thus decides whether the counting result has reached a desired number of product wires to be manufactured in a certain lot or not, that is, whether the manufacture of new lot products is to be started or not.

When a decision has been made in step S1 that the manufacture of the new lot products is to be started, the inter-lot processing data comparing section 23 compares the processing data between the old and new lots, by referring to a plurality of processing data stored in the processing data memory section 17, in step S3.

In step S5, the reset-up item extracting section 25 extracts reset-up items associated with the updating of the processing data between the old and new lots, based on a result of the comparison in step S3. In this case, the reset-up item extracting section 25 extracts all relevant reset-up items without fail, by focusing on a portion of a difference in processing data between the old and new lots. For example, when wire diameters are different with each other, a reset-up item relating to exchanging of an electric wire is extracted. When terminal metal members T are different with each other, a reset-up item relating to exchanging of a terminal metal member T is extracted. When crimping dies are different with each other, a reset-up item relating to exchanging of a crimping die is extracted.

In step S7, the reset-up standard cumulative time calculating section 27 carries out a cumulative calculation of a standard time corresponding to reset-up items extracted by the reset-up item extracting section 25, by referring to a standard time for each reset-up item stored in the standard time memory section 15.

In step S9, the count-down timer 31 starts the counting of a cumulative standard remaining time by sequentially subtracting a lapse time since the starting of a reset-up work from the cumulative standard time calculated by the reset-up standard cumulative time calculating section 27. In this case, the starting time of the reset-up work may be the time when the operator has made an input to start the reset-up operation. Alternatively, the starting time of the reset-up work may be the time when a result of the AND operation for input signals from sensors corresponding to a reset-up, out of the sensors 7, 9, 11 and 13 has shown that at least one of the sensors corresponding to the reset-up has detected a starting of the reset-up work. This time may be selected appropriately.

Figure 7:
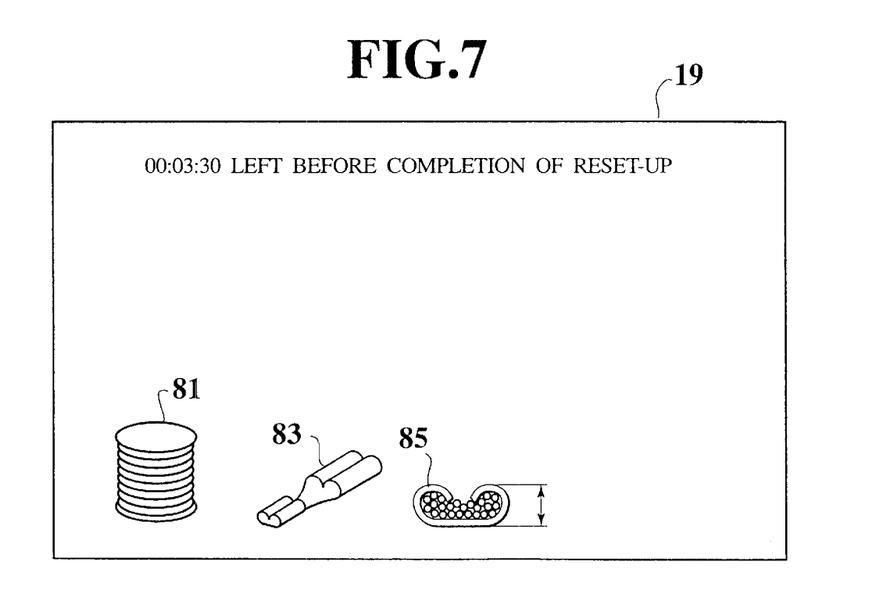
FIG. 7 is a view for showing a display status of information relating to a reset-up.

In step S11, the display section 19 makes the count down display of the cumulative standard remaining time, accompanied by a display of items requiring a reset-up in a design status, as shown in FIG. 7, for example. More specifically, when it is necessary to change over the electric wire W, a design 81 illustrating a wire reel is displayed. When it is necessary to change over the terminal metal member T, a design 83 illustrating the terminal metal member T is displayed. When it is necessary to change over the crimping die, a design 85 illustrating the crimping size of the terminal metal member is displayed. These designs are combined as necessary for a list display.

With this arrangement, the operator can easily understand the progress status of the reset-up work at any time along with the proceeding of this work. Further, as the whole items to be changed over are indicated to the operator, it is possible to improve substantially the efficiency of the reset-up work.

In step S13, the count-down timer 31 makes a decision of a reset-up completion as to whether a result of the calculation sent from the AND circuit 29 shows that all the sensors for the reset-up have detected completion of the reset-up or not, that is, whether all the reset-up work has been completed or not.

As a result of the decision on the reset-up completion in the step S13, when a result of the calculation sent from the AND circuit 29 indicates that at least one sensor out of the sensors for the reset-up has not detected a completion of the reset-up, the count-down timer 31 continues the time counting, and sequentially updates the count-down display of the display section 19. In this case, when at least one of the sensors corresponding to the reset-up has detected a completion of the reset-up, it is possible to erase the display of the corresponding reset-up item.

With this arrangement, as items of which reset-up have not yet been completed among the items to be changed over are indicated to the operator, it is possible to improve more remarkably the efficiency of the reset-up work.

For erasing the display of a reset-up item, it is possible to employ every available mode of displaying designs which makes it possible to discriminate between a design that shows an item of which reset-up work has been completed and a design that shows an item of which reset-up work has not yet been completed. More specifically, it is possible to employ such a mode that a design for showing an item of which reset-up work has been completed has a different color or a different brightness from a design for showing an item of which reset-up work has not yet been completed, so that these two types of designs can be mutually discriminated.

Meanwhile, as a result of the decision on the reset-up completion in the step S13, when a result of the calculation sent from the AND circuit 29 indicates that all the sensors for the reset-up have detected completion of the reset-up, the count-down timer 31 erases all the information relating to the reset-up and finishes the flow of all the processing.

With this arrangement, when all the reset-up works have been completed, it becomes possible to make a display of necessary information of processing data associated with a lot after the reset-up, in place of display contents of the reset-up that is no more necessary. As a result, it is possible to provide an extremely practical information providing status.

As described above, according to the automatic cutting and crimping apparatus relating to the present invention, when a reset-up work has been generated associated with a reset-up in processing data between old and new lots, a cumulative standard time required for the operator to carry out a reset-up work is calculated, and a lapse time since the starting of a reset-up work is subtracted from the calculated cumulative standard time to obtain a cumulative standard remaining time, and the count-down of this cumulative standard remaining time is displayed. Therefore, the operator can easily understand the progress status of the reset-up work at any time along with the proceeding of this work. As a result, it is possible to improve the efficiency of the reset-up work.

It should be understood that many modifications and adaptations of the invention will become apparent to those skilled in the art and it is intended to encompass such obvious modifications and changes in the scope of the claims appended hereto.

What is claimed is:

1. An automatic cutting and crimping apparatus for cutting an electric wire by intermittently feeding the wire for each product wire length and sequentially carrying out a desired terminal processing of the cut wire according to a plurality of processing data including attribute information of each lot of a manufacturing unit, thereby to sequentially manufacture wires finished with a desired processing, the automatic cutting and crimping apparatus comprising:

processing data memory means for storing the plurality of processing data;

standard time memory means for storing standard time required for an operator to carry out reset-up work for each of reset-up items;

a plurality of reset-up completion detecting means for detecting work completions of respective reset-up items;

processing data comparing means for comparing processing data between old and new lots from the plurality of processing data stored in the processing data memory means;

item extracting means for extracting a reset-up item associated with an updating of the processing data between old and new lots, based on a result of a comparison by the processing data comparing means;

standard cumulative time calculating means for accumulating a standard time corresponding to a reset-up item extracted by the item extracting means by using a standard time for each reset-up item stored in the standard time memory means;

cumulative standard remaining time counting means for counting a cumulative standard remaining time by sequentially subtracting a lapse time since a starting of a reset-up work from the cumulative standard time calculated by the standard cumulative time calculating means; and display means for making a count-down display of the cumulative standard remaining time counted by the cumulative standard remaining time counting means, the cumulative standard remaining time counting means continuing the counting when any reset-up completion detecting means does not detect the work completion of the reset-up item corresponding thereto, and the cumulative standard remaining time counting means stopping the counting when all the plurality of reset-up completion detecting means detects the work completions of the respective reset-up items.

2. An automatic cutting and crimping apparatus according to claim 1, wherein the display means makes the count-down display of the cumulative standard remaining time, accompanied by a display of reset-up items extracted by the item extracting means.

3. An automatic cutting and crimping apparatus according to claim 2, wherein reset-up items extracted by the item extracting means are displayed in a list in a design status.

4. An automatic cutting and crimping apparatus according to claim 2, wherein when a work completion has been detected by at least one reset-up completion detecting means out of the plurality of reset-up completion detecting means corresponding to reset-up items extracted by the item extracting means, a reset-up item of which work completion has been detected is erased from display contents on the display means.

5. An automatic cutting and crimping apparatus according to claim 2, wherein the plurality of reset-up completion detecting means detect the work completions of reset-up items respectively by detecting that positions of members in which respective detecting means are provided during a processing period are different from positions of the members during a reset-up period.

6. An automatic cutting and crimping apparatus according to claim 5, wherein the plurality of reset-up completion detecting means detect the work completions of reset-up items respectively by detecting that positions of members in which respective detecting means are provided during a processing period are different from positions of the members during a reset-up period.

7. An automatic cutting and crimping apparatus according to claim 2, wherein when work completions have been detected by all the reset-up completion detecting means corresponding to reset-up items extracted by the item extracting means, all the display contents relating to the reset-up on the display means are erased.

8. An automatic cutting and crimping apparatus according to claim 1, wherein the desired terminal processing of the cut wire includes at least one of stripping of covered wires and crimp-type connection of a terminal member at a terminal portion of the wire.

9. An Automatic cutting and crimping apparatus according to claim 1, wherein the reset-up items include at least one of exchanges of the electric wire, exchanges of a terminal member, and exchanges of a crimping die.

* * * * *